United States Patent [19]

Schafer

[11] Patent Number: 4,486,484
[45] Date of Patent: Dec. 4, 1984

[54] STRIP OF FLEXIBLE CORRUGATED MATERIAL

[75] Inventor: Günter Schafer, Ft. Lauderdale, Fla.

[73] Assignee: Security Lumber & Supply Co., Bradley, Ill.

[21] Appl. No.: 425,567

[22] Filed: Sep. 28, 1982

[51] Int. Cl.³ .......................... B32B 3/28; B32B 1/08
[52] U.S. Cl. .................... 428/182; 138/122; 138/129; 138/135; 428/36; 428/212; 428/222
[58] Field of Search ............... 428/182, 212, 222; 138/121, 122, 129, 173, 135

[56] References Cited

U.S. PATENT DOCUMENTS

| | | | |
|---|---|---|---|
| 3,815,639 | 6/1974 | Westerbarkey | 138/135 |
| 3,913,623 | 10/1975 | Siegwart | 138/122 |
| 4,141,385 | 2/1979 | Siegwart | 138/135 |

FOREIGN PATENT DOCUMENTS 1564933  4/1980  Fed. Rep. of Germany .

Primary Examiner—Paul J. Thibodeau
Attorney, Agent, or Firm—Wood, Dalton, Phillips, Mason & Rowe

[57] ABSTRACT

A strip of very thin flexible material has continuous longitudinal corrugations in the form of curved ridges and hollows, and may be curled helically to form a flexible tube. The strip has a first marginal ridge with a radius of curvature smaller than that of all other ridges, and a second marginal ridge with a radius of curvature larger than that of all other ridges. As the strip is curled with the first marginal ridge overlying a first intermediate ridge and the second marginal ridge underlying a second intermediate ridge, the marginal ridges are respectively spread over and closed under the intermediate ridges to conform to the curvature thereof.

4 Claims, 4 Drawing Figures

STRIP OF FLEXIBLE CORRUGATED MATERIAL

BACKGROUND OF THE INVENTION

It is known to form a flexible corrugated tube by helically curling a strip of very thin metal which has longitudinal corrugations in the form of curved ridges and hollows. Such a tube and a method of making it is disclosed in Siegwart U.S. Pat. No. 4,141,385, granted Feb. 27, 1979. Another patent directed to similar subject matter is Westerbarkey 3,815,639, granted June 11, 1974.

The most desirable corrugated strip material for forming flexible corrugated tube is aluminum which is very thin (about 0.08 mm, or 0.003 in.), so the margins of the strip are very easily distorted during handling. This may result in a finished duct that looks defective but is not, or in a finished duct that actually is defective.

SUMMARY OF THE INVENTION

The principal object of the invention is to provide an improved strip of very thin flexible material that has continuous longitudinal corrugations in the form of curved ridges and hollows occupying the entire width of the strip, the strip being adapted to be curled helically to form a flexible tube with a first marginal ridge along a first margin of the strip overlying a first intermediate ridge, and a second marginal ridge along a second margin of the strip underlying a second intermediate ridge.

The improvement in the strip material resides in the fact that the first marginal ridge has a radius of curvature smaller than that of all other ridges, and the second marginal ridge has a radius of curvature larger than that of all other ridges. As a result, as the strip is helically curled, the first marginal ridge is spread over the first intermediate ridge to conform to the intermediate ridge curvature, and the second marginal ridge is closed beneath the second intermediate ridge to conform to the intermediate ridge curvature.

In a most preferred embodiment, the first marginal ridge has varying radii of curvature and has the smaller radius of curvature only on its side which is at the first margin of the strip, and correspondingly the second marginal ridge has varying radii of curvature and has the larger radius of curvature only on its side which is at the second margin of the strip.

THE DRAWINGS

Figure 3:
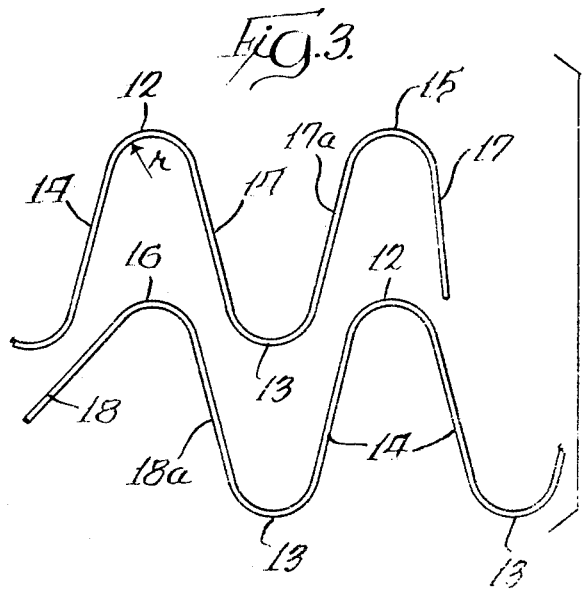
Figure 4:
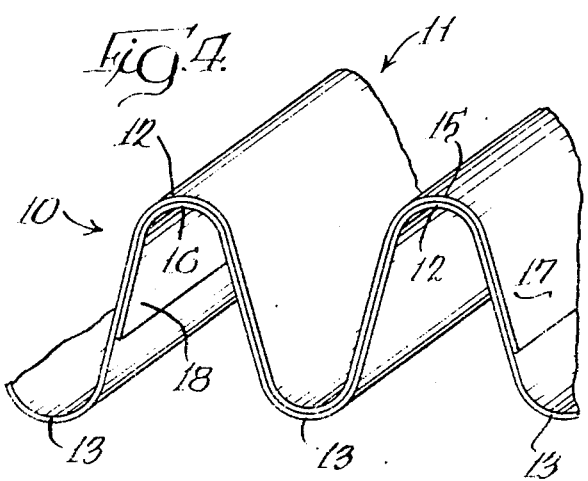

FIG. 3 is a greatly enlarged, fragmentary end view of the two marginal portions of a strip to show the relationship between the first marginal ridge and an underlying intermediate ridge and the relationship of the second marginal ridge and an overlying intermediate ridge; and FIG. 4 is a fragmentary perspective view on a greatly enlarged scale illustrating the marginal portion of the helically curled strip.

DETAILED DESCRIPTION OF THE INVENTION

Figure 1:
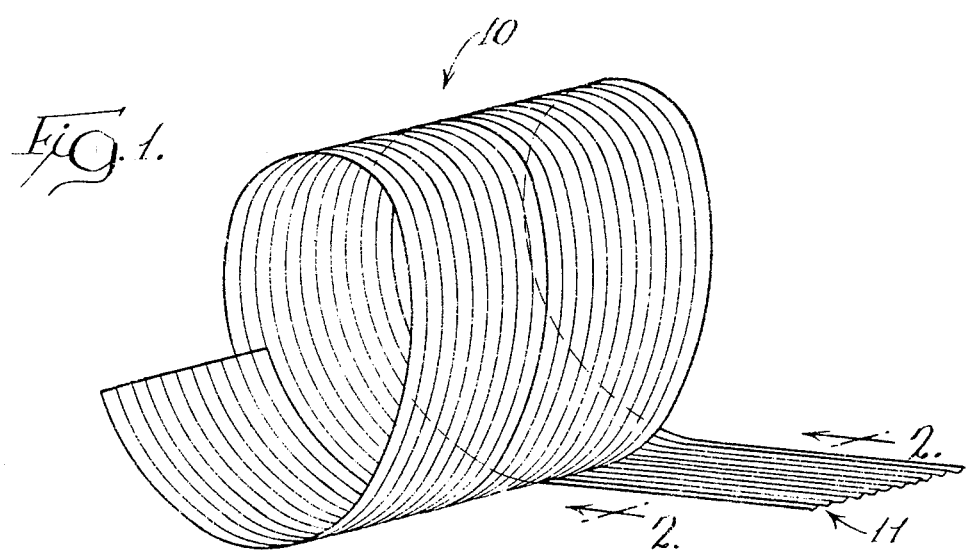
FIG. 1 is a fragmentary perspective view of a section of corrugated strip in accordance with the invention which has been curled helically to form a short length of flexible tube.
Figure 2:
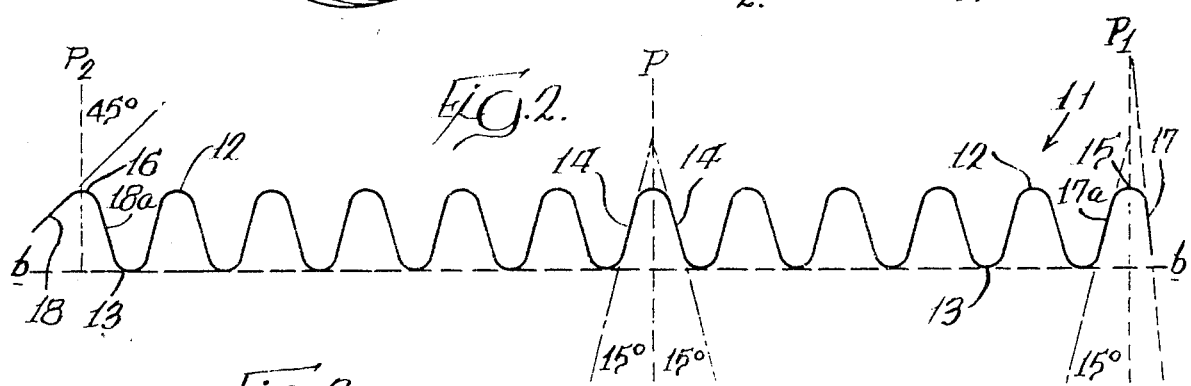
FIG. 2 is a sectional view on an enlarged scale in accordance with the line 2—2 of FIG. 1.

A flexible tube, indicated generally at 10, consists of a strip 11 of very thin flexible material that is provided with continuous longitudinal corrugations in the form of alternate curved ridges 12 and hollows 13 which are seen in FIG. 2 to have sides 14, with the opposite sides of a ridge or a hollow being connected by an apex or a nadir in the form of an arc that has a predetermined radius of curvature, indicated by r in FIG. 3. Each of the sides 14 forms a 15° angle with respect to a reference plane p which is perpendicular to a base plane b—b that is tangent to the nadirs of the corrugations, and each reference plane intersects the uppermost point of an apex arc. In practice, the commercial strip may be 4 cm (about 1.57 in.) wide, and has 12 corrugations across its width.

A first marginal ridge 15 at a first margin of the strip has sides 17 and 17a connected by an arc that has a radius of curvature smaller than that of all other ridges; and a second marginal ridge 16 has sides 18 and 18a connected by an arc that has a radius of curvature larger than that of all other ridges. In each case the marginal ridges have varying radii of curvature, and the different radius of curvature is only on the side of the marginal ridge which is at the margin of the strip. This is clearly seen in FIGS. 2 and 3, where the side 17 of the first marginal ridge 15 is at an angle of 15° to a refrence plane P1, while the side 17 is at a smaller angle to said plane; and the side 18a of the second marginal ridge 16 is at an angle of 15° to a reference plane P2, while the side 18 is at an angle of 45° to said plane.

As seen in FIG. 3, when the strip 11 is curled helically to form a flexible tube 10, the first marginal ridge 15 overlies a first intermediate ridge 12, while the second marginal ridge 16 underlies a second intermediate ridge 12. As the overlapping marginal portions of the strip pass between a pair of curling die rollers as taught in U.S. Pat. No. 4,141,385, the overlapping marginal portions are forced into the position illustrated in FIG. 4 in which the first marginal ridge 15 is spread over the firt intermediate ridge 12, and the second marginal ridge 16 is closed beneath the second intermediate ridge 12, so that both the marginal ridges conform to the intermediate ridge curvature.

The result of the improved corrugated strip structure of the present invention is to provide a tighter and smoother connection between the overlapping marginal ridges 15 and 16 and the intermediate ridges 12 with which they engage.

The foregoing detailed description is given for clearness of understanding only and no unnecessary limitations should be understood therefrom, as modifications will be obvious to those skilled in the art.

I claim:

1. In a strip of very thin flexible material that is provided with continuous longitudinal corrugations in the form of curved ridges and hollows that occupy the entire width of the strip and have alternating apices and nadirs, each of said ridges having two sides connected by an arc that has a predetermined radius of curvature so each of said two sides occupies a predetermined angle with respect to the other of said two sides and with respect to a reference plane that intersects the apex of said arc and is perpendicular to a base line tangent to all said nadirs, there being first and second marginal ridges along opposite borders of said strip each of which has an inner side, and an outer side that defines one of said borders, and intermediate ridges between said marginal ridges, said strip being adapted to be curled helically to form a flexible tube with the first marginal ridge overlying a first intermediate ridge and the second marginal ridge underlying a second intermediate ridge, the improvement comprising:

all the intermediate ridges have arcs with effectively the same radius of curvature, at least a part of the arc of the first marginal ridge has a radius of curvature smaller than that of all other ridges so the angle between the sides of said first marginal ridge is less than that between the sides of the intermediate ridges before said strip is helically curled, and at least a part of the arc of the second marginal ridge has a radius of curvature larger than that of all other ridges so the angle between the sides of said second marginal ridge is greater than that between the sides of said intermediate ridges before said strip is helically curled, whereby, as the strip is helically curled, said first marginal ridge is spread over said first intermediate ridge so the angle between the sides of said first marginal ridge conforms to that of the first intermediate ridge, and said second marginal ridge is closed beneath said second intermediate ridge so the angle between the sides of said second marginal ridge conforms to that of the second intermediate ridge.

2. In a strip of very thin flexible material that is provided with continuous longitudinal corrugations in the form of curved ridges and hollows that occupy the entire width of the strip and have alternating apices and nadirs, each of said ridges having two sides connected by an arc that has a predetermined radius of curvature so each of said two sides occupies a predetermined angle with respect to the other of said two sides and with respect to a reference plane that intersects the apex of said arc and is perpendicular to a base line tangent to all said nadirs, there being first and second marginal ridges along opposite borders of said strip each of which has an inner side, and an outer side that defines one of said borders, and intermediate ridges between said marginal ridges, said strip being adapted to be curled helically to form a flexible tube with the first marginal ridge overlying a first intermediate ridge and the second marginal ridge underlying a second intermediate ridge, the improvement comprising:

the arc of the first marginal ridge has a radius of curvature toward the inner side that is the same as that of the arcs of the intermediate ridges so the angle of said first marginal ridge inner side with respect to the reference plane of said first marginal ridge is the same as that of an intermediate ridge side with respect to the reference plane of said intermediate ridge, and said arc of said first marginal ridge has a smaller radius of curvature toward the outer side, so the angle of the outer side of said first marginal ridge with respect to said reference plane of said first marginal ridge is smaller than that of an intermediate ridge side with respect to the reference plane of said intermediate ridge and at least a part of the arc of the second marginal ridge has a radius of curvature larger than that of all other ridges so the angle between the sides of said second marginal ridge is greater than that between the sides of said intermediate ridges, whereby, as the strip is helically curled, said first marginal ridge is spread over said first intermediate ridge so the angle between the sides of said first marginal ridge conforms to that of the first intermediate ridge, and said second marginal ridge is closed beneath said second intermediate ridge so the angle between the sides of said second marginal ridge conforms to that of the second intermediate ridge.

3. The improvement of claim 2 in which the arc of the second marginal ridge has a radius of curvature toward the inner side that is the same as that of the arcs of the intermediate ridges so the angle of said second marginal ridge inner side with respect to the reference plane of said second marginal ridge is the same as that of an intermediate ridge side with respect to the reference plane of said intermediate ridge, and said arc of said second marginal ridge has a larger radius of curvature toward the outer side, so the angle of the outer side of said second marginal ridge with respect to said reference plane of said second marginal ridge is larger than that of an intermediate ridge side with respect to the reference plane of said intermediate ridge.

4. In a strip of very thin flexible material that is provided with continuous longitudinal corrugations in the form of curved ridges and hollows that occupy the entire width of the strip and have alternating apices and nadirs, each of said ridges having two sides connected by an arc that has a predetermined radius of curvature so each of said two sides occupies a predetermined angle with respect to the other of said two sides and with respect to a reference plane that intersects the apex of said arc and is perpendicular to a base line tangent to all said nadirs, there being first and second marginal ridges along opposite borders of said strip each of which has an inner side, and an outer side that defines one of said borders, and intermediate ridges between said marginal ridges, said strip being adapted to be curled helically to form a flexible tube with the first marginal ridge overlying a first intermediate ridge and the second marginal ridge underlying a second intermediate ridge, the improvement comprising:

all the intermediate ridges have arcs with effectively the same radius of curvature, at least a part of the arc of the first marginal ridge has a radius of curvature smaller than that of all other ridges so the angle between the sides of said first marginal ridge is less than that between the sides of the intermediate ridges, the arc of the second marginal ridge has a radius of curvature toward the inner side that is the same as that of the arcs of the intermediate ridges so the angle of said second marginal ridge inner side with respect to the reference plane of said second marginal ridge is the same as that of an intermediate ridge side with respect to the reference plane of said intermediate ridge, and said arc of said second marginal ridge has a larger radius of curvature toward the outer side, so the angle of the outer side of said second marginal ridge with respect to said reference plane of said second marginal ridge is large than that of an intermediate ridge side with respect to the reference plane of said intermediate ridge, whereby, as the strip is helically curled, said first marginal ridge is spread over said first intermediate ridge so the angle between the sides of said first marginal ridge conforms to that of the first intermediate ridge, and said second marginal ridge is closed beneath said second intermediate ridge so the angle between the sides of said second marginal ridge conforms to that of the second intermediate ridge.

* * * * *